United States Patent [19]
Northcutt

[11] 3,940,868
[45] Mar. 2, 1976

[54] FISH LURE

[76] Inventor: Michael E. Northcutt, 1704 Miramonte Ave., Mountain View, Calif. 94040

[22] Filed: Nov. 30, 1973

[21] Appl. No.: 420,666

[52] U.S. Cl. ............................... 43/17.6; 307/311
[51] Int. Cl.² ..................................... A01K 85/00
[58] Field of Search .................. 43/17.6; 200/61.05; 240/6.4 F, 1 EL; 307/311

[56] References Cited
UNITED STATES PATENTS

| | | | |
|---|---|---|---|
| 757,077 | 4/1904 | Whipple | 43/17.6 |
| 1,079,891 | 11/1913 | Simms | 43/17.6 |
| 1,648,197 | 11/1927 | Roodhouse | 200/61.05 |
| 2,711,044 | 6/1955 | Woods | 43/17.6 |
| 3,040,462 | 6/1962 | Guida | 43/17.6 |
| 3,721,815 | 3/1973 | Wall | 240/1 EL |
| 3,795,821 | 3/1974 | Ichiyanagi | 307/311 X |

OTHER PUBLICATIONS
"Light-Emitting Diodes," David L. Heiserman, *Electronics World*, Jan., 1968, pp. 36-37,67.

"Solid State Optoelectronics," General Electric Specification Bulletin of Jan., 1972.

*Primary Examiner*—Louis G. Mancene
*Assistant Examiner*—Daniel J. Leach

[57] ABSTRACT

A Light Emitting Diode (L.E.D.) that gives off a monochromatic red light of a frequency that is attractive to fish is attached to a conventional fish hook or lure, along with its power supply battery. A water activated switch can be installed to complete the electrical circuit when the lure is immersed in the water. The electrical leads can also function as the leader to the hook. The L.E.D., battery and circuit components can also be installed inside a fish lure body, and can be used in conjunction with other fish lures such as reflecting panels and tied flies.

13 Claims, 9 Drawing Figures

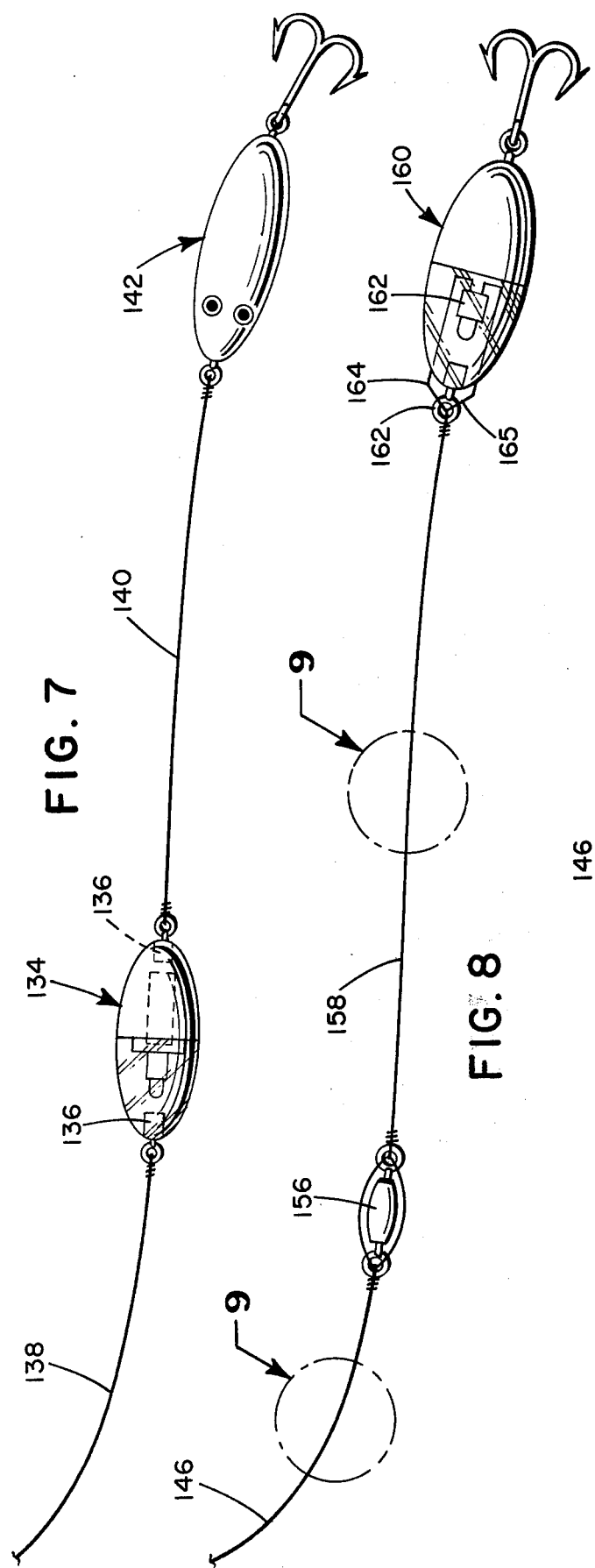

FISH LURE

BACKGROUND OF THE INVENTION

To be effective, a fish lure must draw the attention of the fish. The response of the fish to such stimulation is instinctive, causing the fish to strike at the lure and the accompanying hook. Effective stimulation can take the form of movement, light, or sound, the former two being the most prevalent. An example of movement stimulation is found in a wiggling live worm, or a metal panel of a lure oscillating as the lure is pulled through the water. The most common light stimulation is the reflection of sunlight through the water upon a shiny lure. The prior art is replete with a great number of fishing lures, incorporating both movement and light stimuli alone or in combination. They range from simple to complex, unpowered and powered.

Many attempts have been made to develop effective lighted lures. These have utilized, for the most part, incandescent bulbs as light emitters. However, they gave rise to a number of problems. First of all, incandescent lamps require high current, and it is difficult to supply high current to a lure submerged in water. High current necessitates a powerful power supply, and relatively heavy associated components. The relatively large size of the components renders the lure unattractive to the fish. Furthermore, incandescent lamps are easily broken and cannot take the shock and abuse to which fishing tackle is usually subjected. The components of an incandescent lamp system are not easily adapted to fit conventional fishing equipment, and the system thus becomes expensive. If intermittent light is desired, the system must be even more complex and costly.

SUMMARY OF THE INVENTION

It is an object of this invention to provide a new and improved fish lure that is extremely effective.

A further object of this invention is to provide a fish lure that is easily manufactured of low cost materials.

Another object of this invention is to provide a light emitting fish lure that is simple in design and rugged in construction.

Another object of this invention is to provide a light emitting fish lure that can be utilized with conventional fishing tackle.

Another object of this invention is to provide an electrical powered light emitting fish lure having low power requirements.

Still another object of this invention is to provide a fish lure that gives the appearance of emitting intermittent light.

This invention is directed to a fish lure that overcomes the problems present in the prior art. Basically, it comprises a Light Emitting Diode (L.E.D.) with a power supply means. The L.E.D. is fastened to the fish hook at a point where a fish striking it will hit the hook. The battery can be located adjacent to the L.E.D., or at a point spaced therefrom. For example, the power supply can be attached to the fishing line a few feet from the L.E.D., or can be in the handle of the fishing rod. Or, both the L.E.D. and the power supply can be located with the body of a fish lure. Fibrous light elements can be utilized with the L.E.D., to increase the attractiveness of the lure to the fish. The power to the L.E.D. can be manually controlled, or a water-activated switch can be used.

The invention has a great number of advantages over the prior art lighted lures. An L.E.D. emits a monochromatic red light of a wave length that has been discovered to be particularly attractive to fish. Such light is unidirectional in nature, and thus even slight changes in the orientation of the lure relative to the fish make the light appear intermittent, making it even more interesting to the fish. Electrically, an L.E.D. is extremely efficient, and requires only a slight amount of power to operate. An L.E.D. will last much longer than an incandescent lamp under similar power situations. L.E.D.'s are commonly available at very reasonable cost. They are very sturdy and resist breakage, so that the effects of casting, depths, and encounter with the fish would not be prone to render them inoperable. The L.E.D itself is very small, so that it can be adapted for use with conventional hooks and lures, and the electricals required are simple and of small size.

BRIEF DESCRIPTION OF THE DRAWINGS

FIG. 7 shows the invention used in combination with a conventional fish lure;

FIG. 8 shows the invention in an alternative construction within a lure body; and FIG. 9 is an enlarged sectional view of one type of electrically conductive fish line that can be used with the invention.

DESCRIPTION OF THE PREFERRED EMBODIMENTS OF THE INVENTION

Figure 1:
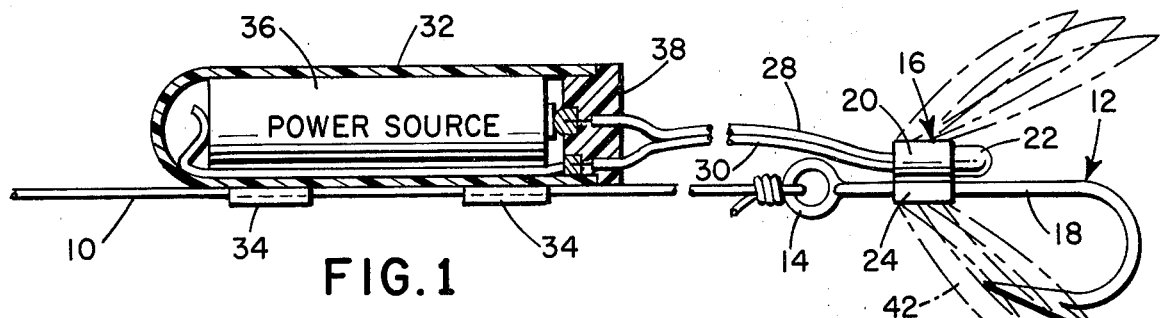
FIG. 1 shows the invention utilized with a conventional fish hook and line.

A conventional fishing line 10 and fish hook 12 are shown in FIG. 1, the line 10 being attached to hook 12 at a hook eye 14. A Light Emitting Diode (L.E.D.) 16 is mounted on the shank 18 of hook 12. The L.E.D. 16 comprises a body 20 and a light emitting portion 22. A spring clip 24 is mounted on body 20 and is then attached to shank 18. Advantageously, spring clip 24 is of the snap type, that can easily be fitted on, and removed from, hook 12. It should be noted, however, that body 20 can be attached to hook 12 by other means, such as line or tape. A pair of electrical lead wires 28 and 30 extend outwardly from body 20 to a power supply casing 32 attached to line 10 by spring clips 34 at a point spaced from hook 12. Power casing 32 contains a battery 36 and the wiring necessary to present the potential of the battery of the L.E.D. lead wires. Lead wires 28 and 30 terminate in plug means 38, which plugs into unit 32 to connect leads 28 and 30 with battery 36. While this is a purely manual manner of activating the L.E.D., other switch means can be used, as described below. Plug 38 closes casing 32 in a waterproof seal.

L.E.D. 16 does not interfere with the use of a conventional tied fly lure 42, which can be installed on hook 12 in the usual manner, to be used in conjunction with L.E.D. 12 to attract fish. Reflective panels or phosphorescent panels can also be used, as can fibrous light conductors, as shown below.

Figure 2:
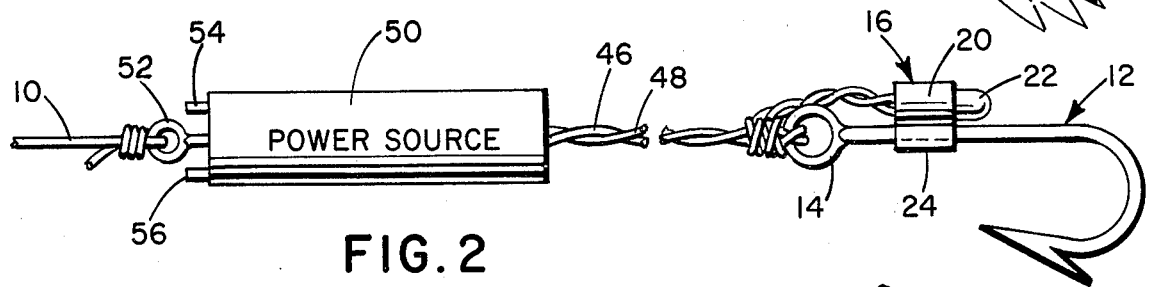
FIG. 2 shows the invention with the electrical leads functioning as the fish hook leader line and equipped with a water-actuated power switch.
Figure 4:
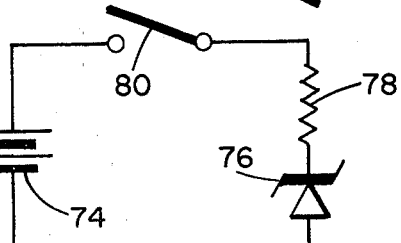
FIG. 4 is a schematic diagram of the electrical circuitry of the invention.

An alternative embodiment of the invention is shown in FIG. 2. As with the first embodiment, a conventional fish hook 12 is used, which has attachment ring 14 and a shank 18. A light emitting diode 16 having a body portion 20 and a light emitting portion 22 is attached to shank 18 by means of spring clip 24. A pair of electrical leads 46 and 48 extend from body portion 20 to a power supply unit 50. Electrical leads 46 and 48 are secured to hook 12, such as by tying, and also form the leader from the hook to the main fishing line 10. Power supply unit 50 has an eye 52 attached thereto, to which fishing line 10 is tied. In this embodiment, power to the L.E.D. is controlled by a water-sensitive switch. A pair of switch probes 54 and 56 extend outwardly of unit 50. Probes 54 and 56 are so spaced from one another as to close the electrical circuit when immersed in water by virtue of the conductivity of the water. A circuit for accomplishing this is shown in FIG. 4. Electrical leads 46 and 48 are secured to unit 50 so strongly as to allow them also to function as a leader. This can be by means of clamps (not shown) within unit 50, or an eye (not shown) similar to eye 52. In such an arrangement, of course, leads 46 and 48 must be fashioned from material of sufficient tensile strength as to be capable of performing as a leader.

Figure 3:
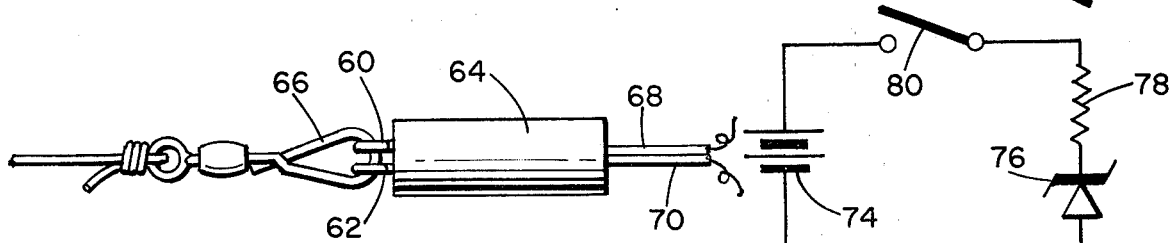
FIG. 3 shows an alternative method of closing the electrical power circuit in the inventive fish lure of FIG. 2.

FIG. 3 shows an alternative means for closing the L.E.D. electrical circuit. Power supply casing 64 has a pair of leads 68 and 70 extending from one end to the L.E.D. (not shown). A pair of switch probes 60 and 62 extend outwardly from the other end of casing 64 connected internally to the electrical circuit. Probes 60 and 62 are in the form of eyes or loops, having central openings. To close the electrical circuit, a conductive snap attachment clip 66, such as is commonly used to attach leaders to lures, is passed through the opening in eyes 60 and 62. Fishing line 10 is attached to clip 66. In this case, the L.E.D. is activated as soon as clip 66 is installed, rather than being activated by the conductive properties of the water.

A preferred electrical circuit is shown in FIG. 4. A battery 74 supplies the power. Battery 74 can be of the disposable type, or of the rechargeable type. In series with battery 74 is the light emitting diode 76, and a resistor 78. The final component in this simple circuit is the switch 80, which can be one of several types, some of which are described above.

Figure 5:
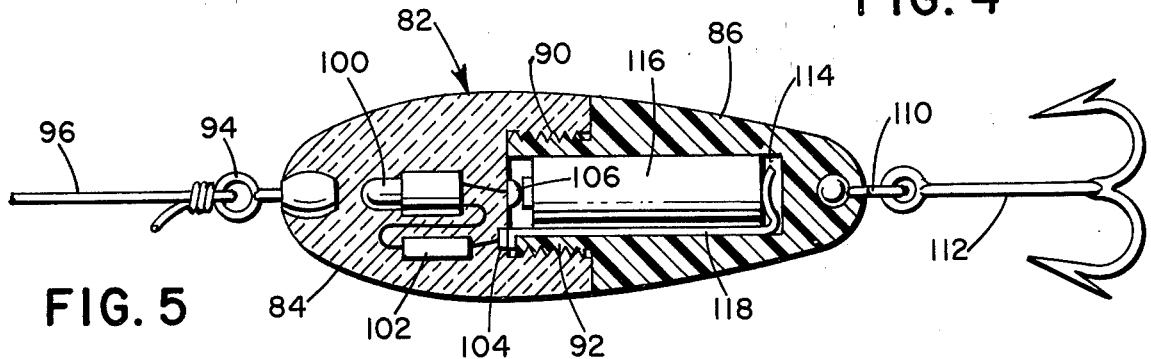
FIG. 5 shows the invention installed within the body of a fish lure.

In FIG. 5, the invention is shown in the form of a fish lure 82 having a body comprising a head portion 84 and a tail portion 86. Head portion 84 is of transparent or translucent material, and is provided with an internally threaded cylindrical recess 90. Tail portion 86 has an externally threaded cylindrical neck 92, which mates with the threaded recess so that the two portions can be screwed together. A swivel-type connector 94 is installed on head portion 84, to which a fish line 96 is attached. An L.E.D. 100 is embedded within head portion 84, along with a resistor 102 and the necessary wiring, which terminates in electrical contacts 104 and 106, exposed to recess 90. Tail portion 86 has a connector 110 to which a barbed fish hook 112 is attached. A battery recess 114 is provided, in which a battery 116 is positioned. A spring conductor 118 is installed in recess 114 to contact the rear of battery 116. When the portions 84 and 86 are tightly screwed together, the head of battery 116 touches contact 106, and spring conductor 118 touches contact 104 and the rear of battery 116, to complete the electrical circuit and cause L.E.D. 100 to be energized.

Figure 6:
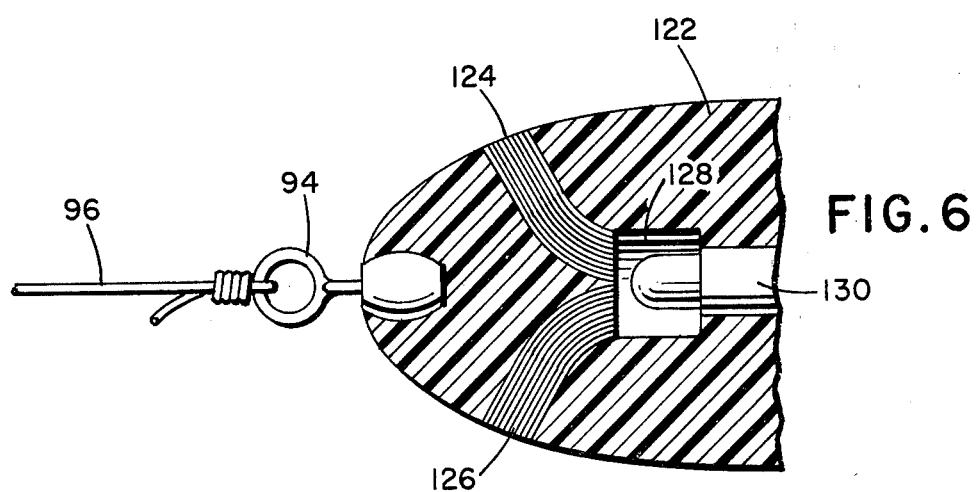
FIG. 6 shows the invention utilized in conjunction with fibrous light conductors.

As an alternative to the structure of FIG. 5, in FIG. 6 the head portion 122 need not be transparent, but is provided with a number of fibrous light conductors 124 and 126 in communication with a light box 128 into which the L.E.D. 130 emits its light. Fibrous light conductors 124 and 126 terminate at the outer surfaces of head portion 122, at which points they will appear lighted. The fibrous conductors can also be used in a transparent head portion.

FIG. 7 shows another preferred manner of using the inventive teachings set forth herein. An L.E.D. lure unit 134 like that shown in FIG. 5 is equipped at each end with a barrel swivel 136, to one of which is attached the fish line 138, and to the other of which is attached a conventional leader 140. A conventional lure 142 is attached to leader 140. Alternatively, lure 142 could be another L.E.D. equipped lure. The ability of the two lures to swivel independently adds to the attractiveness to the fish. This arrangement minimizes the chances of losing the L.E.D. by snagging, etc., and also adds casting weight.

The arrangement shown in FIG. 8 utilizes an L.E.D. power supply located on the fishing rod, in the handle, for example, not shown. A multifilament fishing line 146 containing electrical power conductors is utilized. Line 146 comprises (FIG. 9) a pair of conductive leads 148 and 150 embedded in an insulated covering 152. The strength and felxibility of line 146 are commensurate with that of conventional fishing line. A weighted electrically conductive barrel swivel 156 is attached to line 146. A leader line 158 of construction like that of line 146, but possibly of lesser strength, connects swivel 156 to the L.E.D. lure 160. In this case, lure 160 is similar to that shown in FIG. 5, except that it contains no battery, power being received from a remote source via lines 146 and 158. The lure therefore need only have the L.E.D. 162 itself, plus the connecting wires 164 and 165.

The embodiments above show only a few of the many embodiments and variations thereof that are possible within the scope of this invention. For example, looking to FIG. 5, head portion 84 can be colored with one or several hues. Reflective panels or foils can be positioned in the path of the L.E.D. light, to add interest thereto. The L.E.D. shown in FIG. 1 can be provided with a tiny air chamber, or encased in buoyant material, so that the fly will float on the surface of the water. In addition, electrical circuit interruptors of known types can be incorporated into the L.E.D. circuit to cause the L.E.D. to operate intermittently.

It is quite possible that even more alternatives and modifications will become apparent to those skilled in the art, once having been exposed to the inventive concept. However, the invention is defined only by the scope of the appended claims.

I claim:

1. A fish lure comprising:
   a light emitting diode having a body portion and a light emitting portion,
   means for attaching one of said portions to fish hook means, and,
   power supply means for energizing said light emitting diode.

2. The fish lure of claim 1 wherein said power supply means is spaced from said light emitting diode and is connected to said light emitting diode by electrically conductive strand means.

3. The fish lure of claim 2 wherein said power supply means is attachable to a fishing line.

4. The fish lure of claim 3 wherein said electrically conductive strand means are of high tensile strength material to also function as at least a portion of the fishing line.

5. The fish lure of claim 4 wherein said electrically conductive strand means comprises a fish hook leader.

6. The fish lure of claim 1 further comprising switch means for selectively energizing said light emitting diode.

7. The fish lure of claim 6 wherein said switch means is electrically closed when said switch means is submerged in water.

8. The fish lure of claim 1 wherein said fish hook means comprises a lure body attachable to a fishing line and a fish hook attached to said lure body, and wherein said power supply means is installed inside said lure body.

9. The fish lure of claim 8 wherein said lure body comprises first and second portions and means for attaching said portions together, and wherein said light emitting diode is contained in one of said portions and said power supply means is contained in the other of said portions, and further comprising electrical circuitry in said portions so arranged as to place said power supply means in electrical communication with said light emitting diode when said portions are attached together.

10. The fish lure of claim 1 further comprising a fibrous light element having one end adjacent to said light emitting diode.

11. The fish lure of claim 1 wherein said light emitting diode and said power supply means are spaced from one another, and further comprising electrically conductive fishing line connected between said light emitting diode and said power supply means.

12. The fish lure of claim 1, wherein said light emitting diode emits a unidirectional monochromatic red light.

13. A fish lure comprising:
a lure body,
a light emitting diode for emitting a unidirectional monochromatic red light disposed in said lure body in such a manner as to allow said monochromatic light to radiate outwardly of said lure body, and
power supply means for energizing said light emitting diode.

* * * * *